Figure 1:
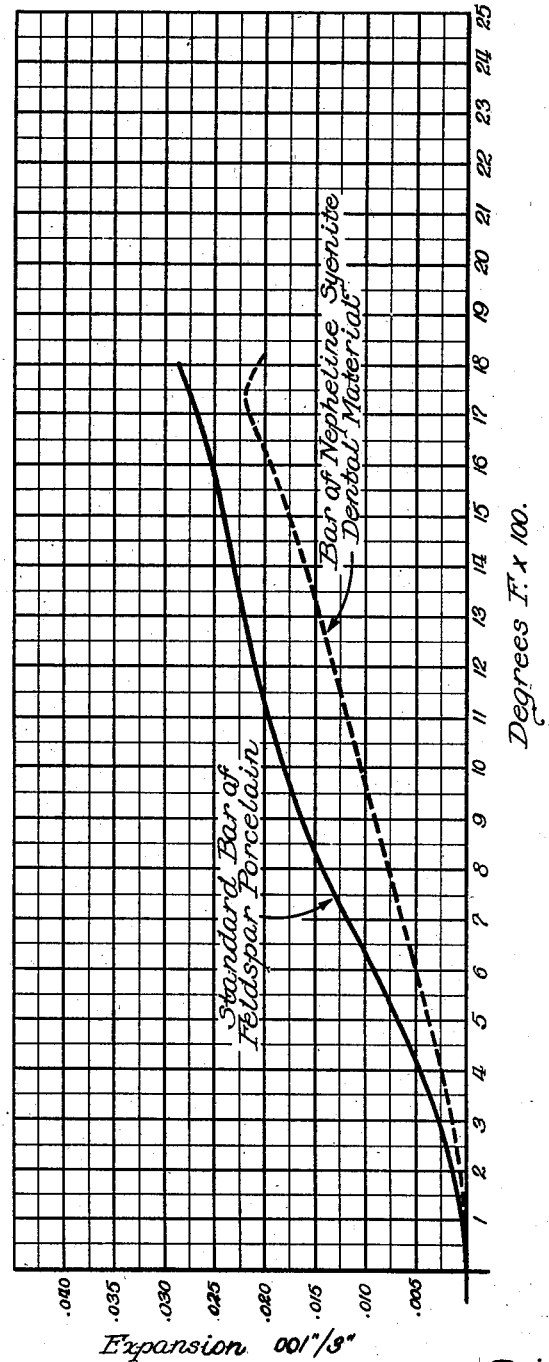

Nov. 16, 1943.   R. W. ERDLE   2,334,319
CERAMIC DENTURE MATERIAL AND DENTURE OR DENTURE PART
Filed June 10, 1939    2 Sheets-Sheet 1

INVENTORS:
Reiner W. Erdle
BY
Crown, Jackson, Critteles & Dienner
ATTORNEYS.

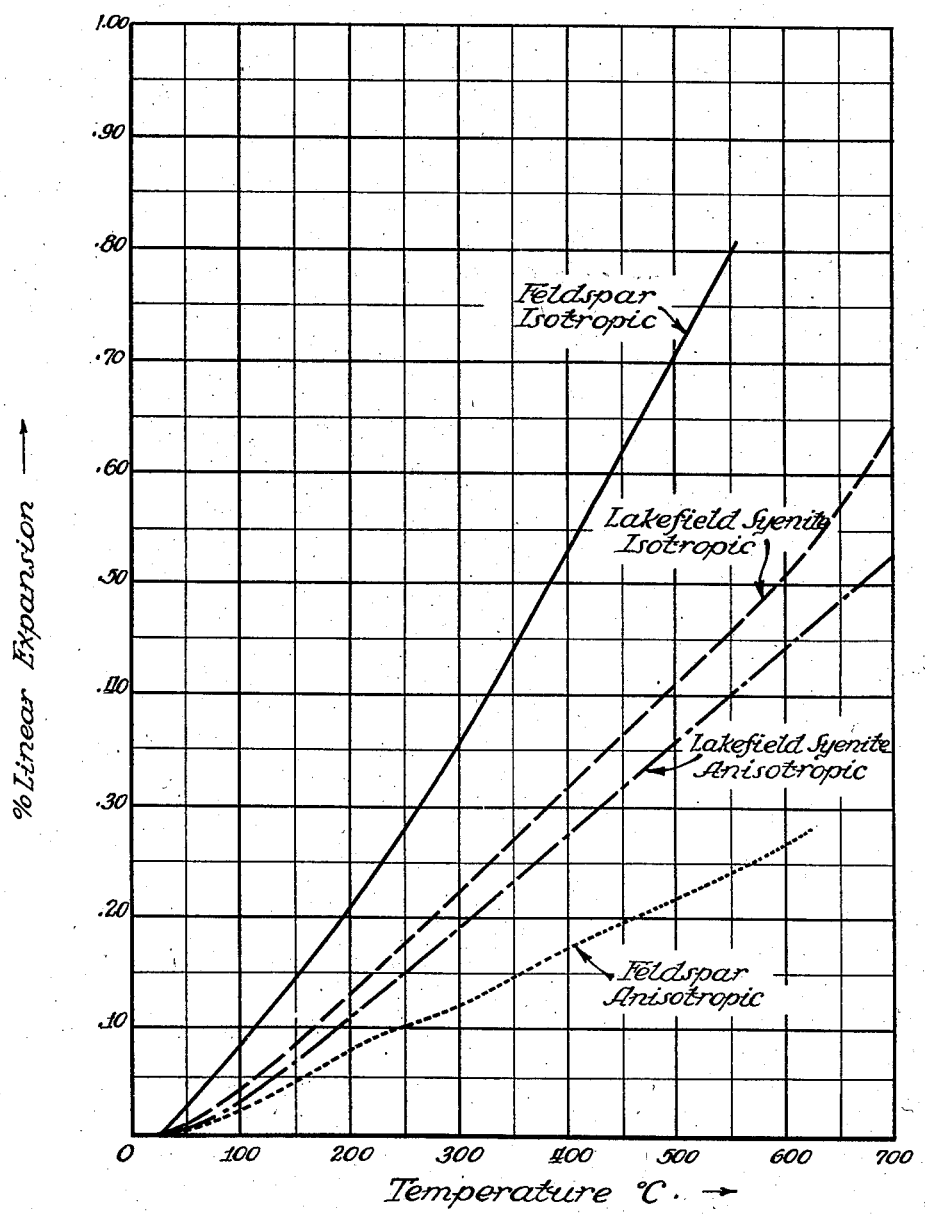

Patented Nov. 16, 1943

2,334,319

UNITED STATES PATENT OFFICE 2,334,319

CERAMIC DENTURE MATERIAL AND DENTURE OR DENTURE PART

Reiner W. Erdle, Chicago, Ill., assignor to Dental Research Corporation, Chicago, Ill., a corporation of Illinois Application June 10, 1939, Serial No. 278,400

4 Claims. (Cl. 32—2)

This invention relates to a novel and improved ceramic denture material and to a denture or denture part formed of such material.

It is to be understood that the term "denture" as used in this specification and in the appended claims is intended to include artificial teeth, dental plates or base parts, jacket crowns, ceramic facings, add-on work, and all other forms of dental structures or parts thereof.

The porcelains heretofore employed in the dental field are recognized and well understood in the art. They have generally consisted of:

(1) Feldspar in combination with an appreciable percentage of bone-ash.

(2) Feldspar in combination with an appreciable percentage of flint and clay.

(3) Feldspar in combination with very small percentages of clay.

In general, ceramic tooth materials have been distinguished by the fact that they have ordinarily been made of compositions consisting largely of feldspar because the addition of clay results in opacity which, while not objectionable in other products and which even affords certain advantages as regards stability and strength, cannot be tolerated in a ceramic tooth material.

Feldspar, while heretofore the primary constituent of denture or tooth porcelains and although having certain advantages, also presents in a ceramic denture or tooth material certain other disadvantageous characteristics which I have found it highly desirable to overcome.

I have found that nepheline syenite is especially well adapted for use in ceramic denture materials and for making dentures and denture parts such as artificial teeth, dental plates or base parts, jacket crowns, add-on sections, and other forms of dentures or denture parts, and that by replacing the feldspar heretofore employed in tooth or denture porcelains with syenite, the latter being also known as Lakefield syenite, or by using syenite in such materials, I provide an improved ceramic denture material and improved dentures or denture parts having highly improved characteristics.

Nepheline syenite is a naturally occurring mineral, varying somewhat in composition depending on the location of the deposit thereof. Two typical nepheline syenites, Bancroft nepheline syenite and Blue Mountain nepheline syenite, have the following compositions:

Bancroft nepheline syenite

| | |
|---|---|
| Silicon dioxide | 48.92 |
| Aluminum oxide | 31.69 |
| Iron oxide | 0.10 |
| Calcium oxide | 0.86 |
| Magnesium oxide | 0.06 |
| Sodium oxide | 13.70 |
| Potassium oxide | 4.06 |
| Loss on ignition | 0.40 |
| | 99.79 |

Blue Mountain or Lakefield nepheline syenite

| | |
|---|---|
| Silicon dioxide | 60.97 |
| Aluminum oxide | 23.34 |
| Iron oxide | 0.06 |
| Calcium oxide | 0.31 |
| Magnesium oxide | 0.03 |
| Sodium oxide | 9.06 |
| Potassium oxide | 5.81 |
| Loss on ignition | 0.50 |
| | 100.08 |

At present, Blue Mountain or Lakefield nepheline syenite appears to be more satisfactory for my purpose, but it is to be understood that within the broader aspects of the invention I do not intend to be limited to this or to either of these syenites except where the same is defined or included in the appended claims.

I am unable to state with certainty why a dental porcelain or denture or denture part consisting largely of feldspar and a ceramic denture material in which the feldspar is replaced in large amount or entirely with syenite, or which contains syenite as herein set forth, should differ in their properties as will herein appear, but I find that such is the case and I have demonstrated the same in actual practice. In general, the syenites differ from the feldspars in that the proportion of alumina is higher in the syenites. The increased proportion of alumina obtained by the use of syenite seems to be definitely an advantage and probably largely accounts for the more extended maturing range, as will herein appear. Also, this increased alumina, particularly in the case of Blue Mountain nepheline syenite, does not produce opacity which is so objectionable in a denture or denture part.

I will describe in the following detailed description the composition of my improved ceramic denture material and how it is employed and the advantages secured in making dentures and denture parts thereof, and I reserve the right to propound and extend the correct reasons for such advantages as and when I become aware of the same.

I am aware that, basically, nepheline syenite has been used in ceramic fields outside the dental ceramic field in lieu of feldspar. However, the use of feldspars and nepheline syenite in the usual or general ceramic field is as a flux for higher fusing raw materials of such character as kaolin, and, as such, the feldspar or the nepheline syenite comprises a minor part of the ceramic formula.

Nepheline syenite has, for example, been recognized as an important flux in the whiteware industry in place of feldspars, and definite important advantages have been recognized in the application in that particular ceramic field.

The application of nepheline syenite in the ceramic field of the dental art is different, in that certain advantages are secured which have not been recognized nor utilized in the ordinary applications of syenite in porcelain bodies outside the dental field.

Moreover, in the preferred embodiments of the present invention in the dental ceramic field, the nepheline syenite no longer serves as a minor constituent whose purpose is to flux other ingredients but, instead, the nepheline syenite becomes the major or a large part of the ceramic dental body which may or may not contain other ingredients in variable percentages, as will hereinafter appear. Certain advantages are obtained, however, where the nepheline syenite constitutes less than the major constituent of the ceramic dental body, and the broader of the appended claims are to be constructed accordingly.

The composition of my improved ceramic denture material, certain illustrative manners of using the same, and the features and advantages of my invention will be apparent from the following detailed description, taken in connection with the accompanying drawings, in which: Figure 1 is a graph showing the thermal expansion curves for a feldspar ceramic body and for one form of nepheline syenite body embodying the present invention; and Figure 2 is a graph showing comparatively the thermal expansion curves for feldspar and Blue Mountain or Lakefield syenite in the anisotropic and isotropic states.

In the preferred embodiment of my invention, the nepheline syenite is preferably Blue Mountain nepheline syenite, or nepheline syenite having about the same chemical analysis as Blue Mountain nepheline syenite, although this may vary, and it preferably constitutes the major constituent of the ceramic denture material.

Merely as an example, a highly satisfactory ceramic denture material, particularly for artificial teeth, and which provides the advantages of the present invention is formed of nepheline syenite as the major constituent, and in speaking of "major constituent" I mean that the nepheline syenite comprises about eighty per cent (80%) or more of the body which may or may not contain other ingredients in variable percentages.

The nepheline may, within the scope of my present invention, constitute up to and including practically one hundred per cent (100%) of the ceramic body, particularly for artificial teeth, and, as will herein appear, it may, within the broader aspects of the invention, constitute lesser percentages of the ceramic body. The syenite may entirely replace the foldspar as heretofore contained in dental porcelains, or it may be combined with feldspar and other ingredients in variable percentages. Frit, which is well known in the dental ceramic art as any low temperature fusing ceramic material, is preferably omitted, particularly where the material is to be used for forming artificial teeth, but frit may, within the present invention, be employed in combination with the nepheline syenite for ceramic molding materials. In speaking of ceramic molding materials, I have particular reference to ceramic molding materials for forming dental plates or base parts, add-on sections, and denture parts other than artificial teeth.

It is to be understood, however, that the ceramic denture materials which I have found particularly advantageous in artificial teeth may be employed in other denture parts and that the ceramic denture materials which I will refer to as advantageous as molding materials may be employed in artificial teeth within the broader aspects of the present invention.

In consideration of a ceramic denture material and its application to ceramic molding, it is to be understood that such molding is not of the type as commonly employed in the ceramic field. In the common practice of the ceramic field, the high clay content of the body affords definite plasticity to the body which allows molding or forming of the cold plastic mass. In the specific use of ceramic denture materials and the molding of these said denture materials to form any one of the many denture parts, there is no plasticity of the material in the cold state, and in order to obtain such plasticity to afford molding, heat is applied to the ceramic denture material in order to soften it so it can be molded under pressure in refractory molds. The application of pressure to the ceramic denture material in its plastic state is also necessary to increase the moldability of the material.

Considering the example already given as comprising about eighty per cent (80%) nepheline syenite as Example I, and the example comprising practically one hundred per cent (100%) nepheline syenite as Example II, further possible illustrative examples of highly satisfactory ceramic denture materials embodying my present invention, particularly for artificial teeth, are as follows:

*Example III*

| | Per cent |
|---|---|
| Feldspar | 95 |
| Nepheline syenite | 5 |

*Example IV*

| | Per cent |
|---|---|
| Feldspar | 90 |
| Nepheline syenite | 10 |

*Example V*

| | Per cent |
|---|---|
| Feldspar | 80 |
| Nepheline syenite | 20 |

*Example VI*

| | Per cent |
|---|---|
| Feldspar | 50 |
| Nepheline syenite | 50 |

It is not the intention by the use of the above given examples to limit the scope of the invention to such combinations of nepheline syenite and feldspar as exemplified. It has been found by experiment and continued practice that small percentages of clay or kaolin incorporated into combination with feldspar provides material for the formation of mullite, and can be considered as a useful part of the combination by preventing the mullite in kyanite—in mixtures containing percentages of this material—from going into solution. Representative examples of these cases are given below, and it should be understood that other materials offering the same functional purpose as clay can be utilized for the clay.

Example VII

|  | Per cent |
|---|---|
| Feldspar | 95 |
| Clay | 5 |

Example VIII

|  | Per cent |
|---|---|
| Nepheline syenite | 95 |
| Clay | 5 |

Example IX

|  | Per cent |
|---|---|
| Feldspar | 93 |
| Kyanite | 5 |
| Clay | 2 |

Example X

|  | Per cent |
|---|---|
| Nepheline syenite | 93 |
| Kyanite | 5 |
| Clay | 2 |

Incorporation of small percentages of clay into ceramic denture materials, particularly ceramic molding denture materials, is also within the scope of the above description.

Still further illustrative examples of highly satisfactory ceramic denture materials embodying my present invention, particularly for ceramic molding denture materials, are as follows:

Example XI

|  | Per cent |
|---|---|
| Frit | 22 |
| Nepheline syenite | 15 |
| Feldspar | 63 |

Example XII

|  | Per cent |
|---|---|
| Frit | 22 |
| Nepheline syenite | 20 |
| Feldspar | 58 |

Example XIII

|  | Per cent |
|---|---|
| Frit | 20 |
| Nepheline syenite | 80 |

In regard to Examples XI, XII, and XIII from the standpoint of the use of frit, it is to be understood that frits, as utilized in the ceramic field, are many in purpose and characteristics. The examples given above embody a frit which has very satisfactory properties for the purpose, and the incorporation of such a particular frit in such definite percentages produces a ceramic denture material having a definite fusing range and moldability characteristics determined or controlled by the frit. The use of other ceramic frits in the same or varied percentages will produce ceramic denture materials of different characteristics, but in many cases entirely suitable for the purpose. For this reason the interpretation of examples should not tend to limit the invention to any one particular frit, or any definite percentage of frit. The use of variable percentages of any one frit naturally influences the characteristics of the ceramic denture material, and use of different frits, likewise, causes variations in properties of the ceramic denture material. The use of various frits and variable percentages of such frits is recognized in the production of these ceramic denture materials.

Representative frit formulae as employed within the scope of this invention are given below, but it is not the desire of the invention to definitely limit the frit to such range.

Frit A

|  | Per cent |
|---|---|
| Feldspar | 50 |
| Borax | 50 |

Frit B

|  | Per cent |
|---|---|
| Feldspar | 45.0 |
| Calcium carbonate | 8.0 |
| Magnesium carbonate | 1.0 |
| Barium carbonate | 5.5 |
| Boric acid | 16.0 |
| Strontium carbonate | 2.0 |
| Flint | 22.5 |

The nepheline syenite and, where there are other ingredients, these other ingredients are preferably finely ground. The finely ground constituents are then intimately mixed, and the mixture is fired in a large kiln as well understood in the dental porcelain art. The firing temperature or fusing point of Example II as herein set forth is about 2150° F., whereas the firing temperatures of Examples III, IV, V, and VI are from about 2150° F. to about 2330° F. The firing or fusing temperatures of Examples XI, XII, and XIII are about 1860° F., 1840° F., and 1760° F., respectively.

Tests have been made which indicate that my improved ceramic denture material as prepared, particularly for the making of artificial teeth, is practically one hundred per cent (100%) isotropic. This isotropic condition, which has reference to a glassy condition, is brought about by two firings of the material. However, by grinding the material sufficiently fine and particularly to a colloidal condition or to substantially a colloidal condition, I find that this isotropic state can be secured by one firing of the material. This isotropic condition is advantageous, particularly for artificial teeth, and, so far as I know, is broadly new in the art.

Where I refer to my improved denture material as being brought to isotropic condition, I mean so far as I am now able to state that it is microscopically isotropic, and that from the X-ray standpoint it may contain a small amount of submiscoscopic, very fine crystals, or anisotropic material.

In using the material, it is ground to the desired grain size following firing of the material, the material may be moistened or mixed with a binder, compacted in a flexible mold to the form of a firm dental body of the desired form by prolonged vibration, removed from the mold and fire-hardened in accordance with the method disclosed and claimed in the copending application of Reiner W. Erdle, Serial No. 101,740, filed September 21, 1936, which has matured into Patent No. 2,196,258, patented April 9, 1940. The foregoing patent also gives illustrative examples of grain sizes to which the material may be ground for use following the firing thereof.

In that the present invention is not limited to forming of the improved ceramic denture material into the form of the desired denture or denture part in accordance with the method of the above mentioned patent, nor to the particular binders disclosed in said application, the details of said method and the particular binders set forth in said patent will not be repeated here. Suffice it to make reference to the above mentioned patent for one highly satisfactory method and for certain highly satisfactory binders for use in forming the improved ceramic denture material of the present application into the form of the desired denture or denture part. Other methods and other binders may be employed as suitable or desired.

The ceramic dental art has certain problems and requirements peculiar thereto since it is essentially concerned with reproducing to as practical degree as possible natural teeth in respect to appearance, strength, resistance to mouth conditions, and shape and minute detail. Since each piece of work is usually practically custom made, as it were, it is necessary that the ceramic dental material be first provided in a plastic state so that it can be properly molded, and then it must be fired to give it the permanent characteristics required. This firing step has presented many difficulties and problems with which general ceramic work outside the dental art is not concerned.

I have found that a ceramic denture material comprising nepheline syenite as a major constituent thereof instead of feldspar has superior characteristics in respect to the firing technique and the finished article. The fusing point is found to be lowered approximately 200° F. This means that less heat or, more specifically, less work heat is necessary to cause the nepheline syenite to reach a point which is ceramically termed "matured or fused." There are certain important advantages brought about through the use of a ceramic body of lower fusing point when considered from the standpoint of the dental art.

Since the firing or baking temperatures of dental porcelains are relatively high, as well known in the art, furnace equipment to be used at such temperatures is expensive, and the cost of such equipment rises rapidly for a relatively small increase in temperature range at the relatively high temperatures which are required. That is, the increase in cost of furnace equipment to get a 200° F. increase in temperature range is much more expensive in the neighborhood of the relatively high firing temperatures which are required than for a corresponding 200° F. increase in the temperature range at lower temperatures. Thus a 200° F. decrease in fusing point becomes very important.

Furthermore, better and more uniform shades of dental porcelains are possible through the use of lower fusing or firing temperatures, which is important in securing exact simulation of the coloring and shading of the natural teeth. The metallic oxides employed for imparting the desired coloring or shading of the artificial teeth are far more stable and reliable at lower temperatures, thereby permitting repeated true reproductions of the desired coloring and shading of the teeth.

Nepheline syenite ceramic dental material has been found to have higher transverse strength and higher impact strength than feldspar dental porcelain. The combination of increased transverse and impact strength of a ceramic body lends to the production of ceramic articles which are stronger and less susceptible to breakage through shock. These factors are, of course, of very great importance in the dental art, and the increased strength is of equal value to my ceramic tooth material as well as to my ceramic molding material.

Another very important advantage of nepheline syenite as a ceramic denture material and in dentures and denture parts is that it permits a much longer firing range than heretofore allowed. That is, the sharp or narrow firing range of feldspar porcelains in the production of porcelain teeth is eliminated and a much wider firing range is possible when the ceramic denture material is made basically to consist of nepheline syenite instead of feldspar. This longer firing range is of outstanding importance in relation to the production of teeth; in fact, the problem of producing teeth is unique because the ceramic material has to be fired up to the point where it practically begins to fuse and, at the same time, the accuracy of form and of retention of all details of the anatomy of the tooth must be maintained. With feldspar porcelains this is rather difficult and requires extremely close control of the temperature. With the syenites a good deal more leeway is possible, and the teeth can be fired to a temperature sufficiently high to bring about a good glasing effect upon the surface without any appreciable tendency to melt down or to obscure the details. Utilization of this advantage, so far as I know, is new in the art and peculiar to the production of artificial teeth and other denture parts.

The longer firing range also allows articles of various sizes to be fired together without the difficulty of unequal degrees of maturity due to the difference in bulk or mass of the materials being fired. This is of great importance when teeth which naturally vary greatly in size are fired together.

The longer firing range is furthermore of especially important advantage in the production of jacket crowns and the like. This phase of dental work is very expensive from the time and skill standpoint, and anything that will reduce the possibility of overfiring, with the resultant loss of time and labor, is obviously of great importance in the dental art. Narrow firing ranges are undesirable because the chance of overfiring, with the resultant loss of the article, is increased, all of which is avoided by my improved ceramic denture material with its longer firing range.

It has been found that nepheline syenite denture material has superior characteristics in respect of thermal expansion over the feldspar dental porcelains as heretofore employed. In this connection I wish to point out that the ideal situation in the dental art is for a ceramic body to have no thermal expansion over wide ranges of temperatures. Although this ideal situation is not obtainable for many reasons, any tendency toward a lowering of the thermal expansion is of definite value because it increases the heat-shock properties of the ceramic denture material.

The superiority of nepheline syenite ceramic dental material in this respect will be more apparent by reference to Figure 1 of the drawings. The full line curve was obtained on a standard specimen bar of feldspar porcelain, and the broken line curve was obtained with a standard specimen bar of nepheline syenite porcelain in accordance with the present invention. The bars, after having been compacted in flexible molds, by means of vertical vibration, were fired to the correct state of maturity and then tested for thermal expansion in accordance with standard technique. It will be noted from the curves that the nepheline syenite material has a much smaller coefficient of thermal expansion than feldspar porcelain. Tests have also shown that, when practical and desirable, further reductions in the thermal expansion properties are possible through the introduction of other materials such as kyanite or sillimanite, both of which are sources of mullite. It has been found that mullite greatly increases the strength of ceramic bodies, which has been attributed to its needle-like crystalline form. Mullite crystals are produced at elevated temperatures in combination with the factor of time. In the firing of feldspar porcelain teeth the temperature of the feldspar body is just about high enough to permit mullite to form, but the time interval is extremely short and it is very doubtful if any mullite is formed. At lower temperatures the formation of mullite is practically precluded.

However, by the addition of kyanite, which consists principally of mullite, mullite is supplied and it imparts the beneficial effect of materially increasing the mechanical strength. It is not feasible to provide such mullite crystals in a body consisting mainly of feldspar, since these crystals were found to dissolve. When the feldspars are replaced by syenite, such solution is greatly decreased because of the greater alumina content of the nepheline syenite. It is on the basis of this explanation that the addition of kyanite can be integrated with the use of syenites in the dental art.

Prior experience has shown that the expansion of tooth porcelain can be modified to a surprising degree by differences in the temperature or time cycle of the firing operation. This, of course, makes the porcelain susceptible to variation in thermal expansion on account of the difficulty in maintaining exactly uniform production conditions. As the result of my invention in connection with nepheline syenite ceramic dental materials, it appears that such variation in thermal expansion caused by variation of the time and temperature cycles is considerably less than in connection with feldspar dental porcelains. This increased uniformity of production is an important factor in ceramic dental work.

I have further found that denture bodies made of nepheline syenite have far greater thermal expansion stability, which is especially important in dental work. It is known that the process used in the production of a ceramic body vitally influences the thermal expansion properties of the final product. The production variations which occur and tend to influence the thermal properties is a serious matter in the dental art, because they prevent safe and practical use of repeated batches of produced ceramic bodies. Moreover, the joint use of ceramic bodies with unlike thermal properties—for example, the use of a tooth formed of tooth porcelain with a dental plate or base part formed of molding porcelain—produces strains in the resulting product, which decreases the strength of the denture. Nepheline syenite ceramic dental bodies have shown marked reduction in the tendency of thermal expansion variation, and this, accordingly, is of very definite advantage since it reduces the danger of strains in the final dental article.

I find that dental bodies comprising or formed of nepheline syenite have definitely better form stability under firing cycles. This form stability and wider firing range of bodies comprising or formed of nepheline syenite are due to the higher viscosity of the nepheline syenite as the bodies approach the so-called fusing point. Similar bodies composed of feldspar have a lesser form stability and narrower firing range of the bodies because of the lower viscosity of the feldspar as the bodies approach the fusing point. Narrow limits of firing range mean that form stability and the subsequent accuracy of reproduction are limited to very carefully controlled firing operations. Increasing the firing range allows accurate reproduction over a greater scale, and this is advantageous. Loss of produce through inaccurate reproduction particularly in the dental art, is expensive and undesirable.

As shown in Figure 2 of the drawings, the thermal expansion curves for Lakefield syenite in the anisotropic and isotropic states are very close together, whereas, as shown in the same figure, the thermal expansion curves for feldspar in the anisotropic and isotropic states are very far apart. The great difference in the curves for feldspar in the anisotropic and isotropic states is very undesirable because the thermal expansion curves will vary widely, depending upon how much of the material has gone over into the isotropic state.

The fact that the curves for the isotropic and anisotropic states of the nepheline syenite are so close together is believed to account for some of the very desirable characteristics of the nepheline syenite. To a very considerable extent, regardless of the degree to which isotropic material is present, the expansion curve will be stable. It is also believed that this accounts for or has to do with the higher strength of the syenite bodies, because, with two different constituents present having different expansion characteristics, it is readily conceivable that the strength will be reduced. It should also definitely improve the resistance to thermal shocks. In addition, due to the stability of the expansion curve, it would be much easier to use it in combination with glazes and "add-on" porcelain on account of its stable expansion characteristics.

The factor of translucency is important in ceramic dental work, and I have found that the translucency of nepheline syenite ceramic dental materials compares very favorably with that of feldspar porcelain. It has been definitely noted that nepheline syenite produces a luster that is somewhat better than is generally obtained with feldspar.

In certain instances in dental work it is desired to retain all of the translucent characteristics of the tooth in spite of a metal backup piece. The art of using porcelain facings and metal backings is not new, but so far as I know, it is new successfully to use a translucent facing of a nepheline syenite or a feldspar body in combination with a metal backing, and yet not have the metal show or affect the translucency or shade of the facing. A definite method has been worked out by me in order to arrive at the desired characteristic of translucency of the facing. The ceramic facing—either of nepheline syenite base or of feldspar base—is fired to a biscuit bake (a point where hardness is obtained without any glaze or translucency). Very finely ground zirconium oxide is applied to that portion of the facing which is to be in contact with the metal backing. The oxide penetrates to a slight depth into the facing. Upon firing, it will be seen that the opacifier—zirconium oxide in this instance—has penetrated to a slight depth into the ceramic facing and now prevents the metal from showing through the translucent facing; but still a translucent effect is preserved in the facing. Porcelain teeth or teeth comprising nepheline syenite in the biscuit state are not vitrified, and therefore it is possible by painting on or rubbing on the opacifier to cause it to enter slightly into the pores of the ceramic material. This is a highly important feature in connection with this type of work.

Nepheline syenite may be very successfully used in glazes for dental ceramic work, and this work may be materially aided by the fact that one of the superior characteristics of nepheline syenite is that it has better adhesion to other ceramic bodies than does feldspar. The result has been that I am able to use glazes in my work having the same molecular formula as feldspar glazes but composed of nepheline syenite to advantage in that the same desirable properties of adhesion to ceramic bodies are obtained at definitely lower temperatures. Since the chemical properties of a glaze—its resistance to solubility in water, acid, and the like—are determined by the molecular formula and the practicability determined by the fusing range, I have lost none of the desired resistance to solubility in various media, and yet I have lowered the fusing point of the glaze through the use of nepheline syenite in place of feldspar. Where the nepheline syenite glaze is used with dental porcelain bodies, it appears to wet the porcelain more readily than the feldspar glazes.

In tooth work it is necessary to obtain rough surfaces on certain portions of teeth which are to be used in conjunction with denture base material such as vulcanite, formaldehyde resins, acrylic resins, or other denture base materials in order to retain the teeth in the denture base material. Such roughened surfaces may be obtained by fusing highly refractory grains of definite size—such as fused magnesia—to the tooth surfaces by means of a glaze. Nepheline syenite glazes have been found to be superior for this purpose to feldspar glazes of substantially the same molecular formula because of the greater adhesion and lower fusing point of the nepheline syenite glazes. This also permits the use of less expensive equipment for such grain applications.

In attempting to produce porcelain bodies of lower fusing point and other characteristics it is common practice to add frits to these bodies. However, the general result is that form stability has been sacrificed. I find that far greater percentages of nepheline syenite frit may be added to either nepheline syenite ceramic dental materials or feldspar dental porcelains without loss of form stability than can be correspondingly added if the frit is a feldspar frit. This allows greater latitude of modification of dental ceramic bodies through the introduction of frits, and it is of very definite value.

Frequently it is necessary to make additions to a fired porcelain tooth, such additions technically being called "add-ons," "add-on parts," or "add-on sections." Nepheline syenite has been found to be particularly desirable in this phase of ceramic dental work. Presumably, the excellent form stability and glaze adhesion of nepheline syenite make it so desirable in this respect. An add-on ceramic material must have a fusing point lower than the tooth to which it is to be added, which tooth has been previously fired, namely a fusing point lower than about 2360° F.

I have found that, by providing an add-on ceramic material comprising thirty per cent (30%) frit of nepheline syenite base and the remainder regular tooth porcelain of a feldspar nature, the fusing point could be lowered from 2360° F. to about 2150° F., a drop of approximately 200° F. Further research showed that up to fifty per cent (50%) frit of nepheline syenite base could be used further to lower the fusing point to 1950° F., at which temperature it is possible to utilize the more practical nichrome wound furnaces which are more commonly found in dental laboratories. Tests show that the original tooth and the add-on section become a definite single integral unit. The firing cycle for each of the add-on compositions will vary according to the composition thereof. Results obtainable with such add-on materials have been uniformly very successful.

An illustrative formula for frit of the type mentioned in the preceding paragraph is as follows, although this frit formula may vary, and therefore the invention is not limited in this respect to this particular frit:

Frit C

| | Per cent |
|---|---|
| Nepheline syenite | 37.5 |
| Calcium carbonate | 8.0 |
| Barium carbonate | 5.5 |
| Magnesium carbonate | 1.0 |
| Strontium carbonate | 2.0 |
| Boric acid | 16.0 |
| Flint | 30.0 |

The consideration of proper shade depends on the shade of the tooth to which the addition is to be made and at what portion of the tooth the addition occurs. For example, if the addition is at the gingival of a shade 46 tooth—porcelain 46–3 may be used in the proportion of about thirty per cent (30%) add-on glaze to about seventy per cent (70%) tooth porcelain of the desired shade. The add-on mixture is mixed with water and applied by hand in the usual method as employed in jacket work. The possible add-on conditions are practically unlimited. It is necessary to extend the add-on area from the tooth to which the addition is being made an amount to compensate for shrinkage. The degree of extension will depend on the degree of packing and can be readily ascertained by practice.

After the add-on material has been built up to the desired conformation it is placed on a tooth-firing slab and thoroughly dried in the drying chamber. The firing cycle for the thirty per cent (30%) to seventy per cent (70%) mixture set forth is:

(a) Drying chamber—30 minutes.
(b) Preheat chamber—20 to 30 minutes.
(c) Firing chamber:
  (1) In—1600° F.
  (2) Out—2150° F.
  (3) Time—30 to 35 minutes, the furnace being preferably slowed down by reducing the air and gas.

Upon removal from the firing chamber the tooth or other denture part with the add-on material applied thereto is preferably placed under glass to cool. After the tooth has been completely cooled, the add-on area can be dressed with mounted stones and polished.

It is also possible to use glycerine and water mixture for the add-on work, in the use of which some technicians may be very apt.

In connection with nichrome wound electric furnaces, the formula is preferably 50% add-on glaze to 50% tooth porcelain of the desired shade, as already set forth. The add-on is built up as before, and after being fairly dry is placed in a cold electric furnace and brought up slowly to 1950° F.—about 25 to 30 minutes. The furnace is then held at 1950° F. for about 20 minutes in order to facilitate complete maturity of the add-on material. The tooth can be cooled down completely with the furnace, or placed under glass.

Another ratio of materials is 40% add-on glaze to 60% tooth porcelain of the desired shade. This has a firing temperature of 2050° F. but requires a soaking period of about 10 minutes at 2050° F.

I have found that molding porcelains incorporating nepheline syenite in connection with feldspar and a frit have definitely better flow under pressure—as utilized in my dental molding technique—than the same type of porcelain in which the nepheline syenite is not a part of the formula. The introduction of the nepheline syenite in increasing percentages from ten per cent (10%) to sixty-five per cent (65%) causes a continued reduction of necessary fusing temperatures and, at the same time, causes a continued reduction of temperatures necessary for molding the denture under pressure. At the same time, with this reduced temperature I have found that the molding properties of these ceramic materials are definitely improved since they require less time to complete the molding operation. All of these points in connection with better flow under pressure are of distinct advantage in dental ceramic work.

I have also found that the incorporation of nepheline syenite in various percentages ranging from ten per cent (10%) to eighty per cent (80%) produces a molding porcelain which tends to have a much better separation from the investment, and at the same time affords a much smoother surface to the molded denture or denture part upon removal from the investment.

In connection with my standard molding porcelain now utilized, which is a combination of a frit and feldspar, I find it necessary to remove the investment by means of a stiff wire bristle brush rotated at relatively high speed. It is not an excessively laborious process, but at the same time I have found repeatedly that molding porcelains which are a combination of syenite, feldspar, and frit, or which are a combination of syenite and a frit, definitely free themselves much easier and much cleaner from the investment. This affords a better working surface on the molded denture, and reduces the labor required for finishing and polishing. Syenite incorporated into the molded ceramic denture or denture part gives me a better surface on the molded article upon which the finishing must be done.

I further find that ceramic molding dental materials containing part syenite in conjunction wtih feldspar and a frit, or syenite in combination with a frit, are better from the standpoint of resisting a chipping action which results from overheating during grinding operations. Repeated results have definitely established the fact that ceramic dental materials containing syenite are able to become much hotter during the grinding operation without any objectionable chipping action. This is definitely a point of advantage.

I have conducted experimental work on ceramic molding materials for dental work in which I have made combinations of feldspar, syenite, and frit, and this work leads me to make the following statements:

1. Increased percentages of syenite improve the moldability.
2. Increased percentages of syenite lower the fusing point of the ceramic material and, in this way, allows me to work at a lower range where a more satisfactory pink color can be produced. It is definitely of advantage to be able to work in lower ranges in connection with pink colors since it prevents the pink from assuming a blue or purple tinge, which is highly objectionable in connection with the application of these materials in the mouth.
3. The incorporation of increased percentages of syenite into a ceramic material for dental use affords better moldability at reduced temperatures.
4. In further consideration of my work, I have found that it is possible to form a thin shell of a porcelain tooth from tooth porcelain and to mold the desired thickness inside the shell—producing a rebased tooth shell. The application in this way is of distinct advantage since it allows me to do the jacket crown work, which is an important field in the dental art, and at the same time allows me to produce these jacket crowns of a much better character in so far as strength and translucency are concerned. Likewise it reduces the amount of labor and the expense entailed in the former method of producing these jacket crowns. Formerly it required work by skilled artisans to produce jacket crowns of this character, but by my method I find that the work now becomes a more practical operation.

I find that with these thin tooth porcelain shells it is possible for me to produce the jacket crowns by direct molding operation, and my work indicates that the molding porcelain with the thin veneer of tooth porcelain becomes a unitary tooth which will not be weak as a result of any differences in coefficient of expansion between the tooth and molding materials. The thinness of the tooth porcelain veneer allows this operation to be accomplished, and the incorporation of a direct molding with a syenite molding ceramic material or a syenite-feldspar combination is in direct line since these molding materials have better molding properties at reduced temperatures. The thin sections and small parts which, of necessity, are molded in connection with jacket crown work, can be more advantageously accomplished when the molding properties of the ceramic material are distinctly improved as a result of the syenite combinations.

A further consideration of this tooth porcelain veneer is the possibility of molding almost a unilateral denture in which there is a series of tooth porcelain veneers covering the molding ceramic base. In this way the tooth porcelain or the ceramic tooth material acts as a virtual glaze to the ceramic molding material and produces a more natural tooth than is possible to obtain directly by molding. It also eliminates the consideration and necessity of exactness of the two curves—molding and tooth ceramic material curves—which is essential when molding directly to solid teeth. The accomplishment of utilizing the thin veneer of ceramic tooth material as a superimposed glaze to the molded ceramic base will allow me to have all of the properties of my teeth in so far as shade and detail are concerned, and at the same time I will have a strong base as a result of the molded ceramic material.

Various other changes and modifications may be made in the details herein described without departing from the invention or sacrificing the advantages thereof.

I claim:

1. As a new article of manufacture, a porcelain denture part formed of a fused porcelain comprising isotropic nepheline syenite.

2. As a new article of manufacture, a denture part formed of a fused porcelain mixture comprising isotropic nepheline syenite in major proportion.

3. As a new article of manufacture, a denture part formed of a fused porcelain mixture comprising isotropic nepheline syenite and feldspar with the nepheline syenite present in major proportion.

4. As a new article of manufacture, a porcelain denture part formed of a fused porcelain comprising a prefired isotropic nepheline syenite.

REINER W. ERDLE.